United States Patent [19]

VanAuken

[11] 4,131,701
[45] Dec. 26, 1978

[54] COMPOSITE TUBULAR ELEMENTS

[75] Inventor: Richard L. VanAuken, Bridgewater, N.J.

[73] Assignee: Exxon Research & Engineering Co., Florham Park, N.J.

[21] Appl. No.: 856,615

[22] Filed: Dec. 2, 1977

Related U.S. Application Data

[63] Continuation-in-part of Ser. No. 801,028, May 27, 1977.

[51] Int. Cl.$^2$ .......................... B32B 5/12; F16C 1/02
[52] U.S. Cl. ......................................... 428/36; 64/1 S; 273/80 R; 273/DIG. 7; 273/DIG. 23; 428/111; 428/251; 428/294; 428/302; 428/368; 428/376; 428/398; 428/902
[58] Field of Search .................. 428/36, 368, 110–114, 428/251, 294, 301–302, 367, 365, 376, 398, 902, 545, 586, 600; 156/53, 56, 187, 188, 215, 313, 158, 94; 273/80 R, 80 B, DIG. 7, DIG. 23; 301/126; 64/1 S

[56] References Cited

U.S. PATENT DOCUMENTS

| 3,166,319 | 1/1965 | Brilhart | 273/80 B |
|---|---|---|---|
| 3,457,962 | 7/1969 | Shobert | 273/80 R |
| 3,554,590 | 1/1971 | Tarantino | 273/80 R |
| 3,969,557 | 7/1976 | Jenks | 273/80 R |
| 4,039,006 | 8/1977 | Inoue et al. | 428/36 X |

FOREIGN PATENT DOCUMENTS 1351732  5/1974  United Kingdom ................ 273/80 R Primary Examiner—Michael G. Wityshyn
Attorney, Agent, or Firm—Joseph J. Dvorak

[57] ABSTRACT

A novel tubular composite structure for transmitting substantial forces comprising a metal tubular core having a layer of structural metal adhesive on the exterior thereof. On top of the structural adhesive layer are alternating laminae of resin impregnated unidirectional reinforcing fibers and of woven fiberglass, beginning with a layer of woven fiberglass followed by a lamina of resin impregnated unidirectional reinforcing fibers and continuing in alternating fashion but ending with a final layer of resin impregnated continuous unidirectional reinforcing fibers. All fibers are disposed at a predetermined angle of orientation with respect to the longitudinal axis of the tube. The number of layers disposed along the length of the tubular core varies such that the core thickness along the length of the tubular shaft has its greatest thickness at the mid section of the shaft.

8 Claims, 6 Drawing Figures

COMPOSITE TUBULAR ELEMENTS

CROSS REFERENCE TO RELATED APPLICATION

This application is a continuation-in-part of application Ser. No. 801,028, filed May 27, 1977.

BACKGROUND OF THE INVENTION

1. Field of the Invention

This invention relates to improved rotating elements especially useful for transmitting forces, and for sustaining axial and torque bearing forces.

2. Prior Art

Conventional rotating elements intended for transmission of forces such as rotors or drive shafts are generally made of metal since these metal rotors or drive shafts are believed generally to posses great durability. More recently, however, there has been a considerable interest in reducing the weight of such rotating elements, particularly in vehicles, thereby increasing the fuel efficiencies at which those elements are driven. Thus, the design of a rotor or drive shaft of lighter weight has gained considerable interest from a fuel efficiency viewpoint. However, the design of a rotor or drive shaft, not only of lighter weight but also of greater axial stiffness, additionally would permit the use of such shaft in higher critical speed environments than presently possible with an all metal shaft.

In the past, some attempts have been made to design a lighter drive shaft. For example, it is known to reinforce metal tubes with helically wound filaments which are subsequently impregnated with a resin such as an epoxy resin, thereby forming a composite structure which has a metal portion and a plastic portion reinforced with continuous filament windings. Composite structures of this type have been capable of withstanding high circumferential speeds; however, they suffer from other disadvantages. For example, such helically wound rotors have inadequate axial stiffness for drive shaft applications.

As is pointed out in copending application Ser. No. 801,028, filed May 27, 1977, in order to get the requisite performance from a rotor or drive shaft which is fabricated from both a fiber-reinforced resin and a tubular metal shaft, the two essential load bearing materials, i.e. the metal and the fiber, must be combined in such a way as to operate harmoniously in adsorbing and transmitting substantial torsion and bending loads. Accordingly, improved tubular composites for transmitting torsion and bending loads are disclosed in the aforementioned patent application in which the axial loads primarily are borne by unidirectional reinforcing fiber filaments. These fiber filaments are embedded in a resin matrix. The primary torque loads are borne by a metal tube. The metal and fibers provide a composite structure in which the fibers are oriented at a predetermined angle of orientation so as to compensate for the significant differences in the physical properties of the fiber-reinforced resin and the physical properties of the metal tube, such as, for example, the difference in the thermal coefficient of expansion of the metal tube and the thermal coefficient of expansion of fiber of the fiber-reinforced resin. Thus, in the aforementioned patent application, there is described a tubular composite structure which comprises a metal tubular core, preferably of aluminum, having a layer of structural metal adhesive on the exterior surface of the metal core. On top of the structural adhesive layer are alternating laminae of resin-impregnated unidirectional reinforcing fibers, particularly carbon or graphite fibers, and of woven fiberglass, beginning with a layer of woven fiberglass followed by a lamina of resin-impregnated continuous unidirectional reinforcing fibers and continuing in alternating fashion but ending with a final layer of resin-impregnated continuous unidirectional reinforcing fibers. Each successive layer of resin-impregnated continuous unidirectional reinforcing fibers has the fibers oriented at an angle of between about 5° to 20° with respect to the longitudinal axis of the metal tube and in opposite orientation with respect to the next preceding layer. Such a tube is fabricated by preferentially wrapping around the metal core a generally quadrangular laminate of such fiber-reinforcing materials so as to provide a substantially cylindrical composite shaft having a uniform thickness of fiber-reinforced resin on the surface of the core.

SUMMARY OF THE INVENTION

It has now been discovered that the fiber-reinforced layer of such a composite tubular shaft does not have to be of uniform thickness along the length of the shaft in order to achieve the requisite mechanical properties with respect to transmitting torsion and bending loads; but rather the greatest amount of fiber-reinforced resin is needed substantially in the center portion of the tubular composite and less reinforcing material is required at the extremities thereof.

Thus, generally speaking, the present invention provides an improved tubular composite for transmitting substantial torsion and bending loads which comprises a metal tubular core, preferably of aluminum, having a layer of structural metal adhesive on the exterior surface of the core. On top of the structural adhesive layer are alternating laminae of resin-impregnated unidirectional reinforcing fibers, particularly carbon or graphite fibers, and of woven fiberglass, beginning with a layer of woven fiberglass followed by a lamina of resin-impregnated unidirectional reinforcing fibers and continuing in alternating fashion but ending with a final layer of resin-impregnated continuous unidirectional reinforcing fibers. Each successive layer of resin-impregnated continuous unidirectional fibers has the fibers oriented at an angle of between about 5° to 20° with respect to the longitudinal axis of the metal tube and in opposite orientation with respect to the next preceding layer. The fibers in the woven fiberglass layer are oriented at 0° and 90° with respect to the longitudinal axis of the metal tubular core. Most importantly, the number of layers disposed along the length of the tubular core varies such that the wall thickness along the length of the tubular metal shaft has its greatest thickness at substantially the mid-section of the shaft.

These and other embodiments of the present invention will become readily apparent upon a reading of the detailed description which follows in conjunction with the drawings.

DETAILED DESCRIPTION OF THE INVENTION

Figure 1:
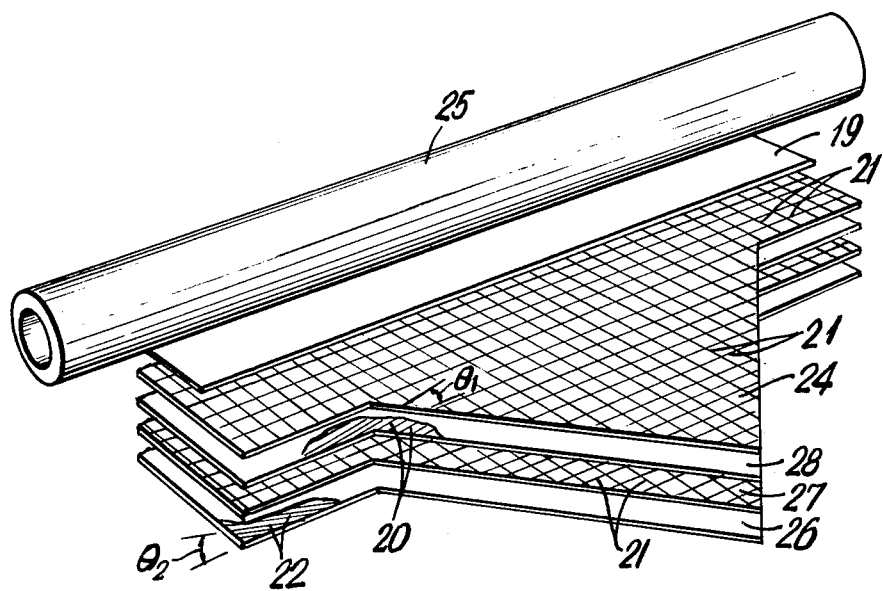
FIG. 1 is an isometric drawing partly in perspective and partly cut away showing the relationship of the alternating sheets of glass fibers in unidirectional resin-impregnated fiber-reinforcing layers to the metal core.

Referring now to the drawings, it should be noted that like reference characters designate corresponding parts throughout the several drawings and views.

The drive shaft of the present invention has a metal core 25 in the form of a cylindrical hollow tube as is shown in FIG. 1. In order that the drive shaft will have the requisite strength and weight, it is preferred that the metal core be fabricated from aluminum or magnesium alloys. Indeed, it is particularly preferred that core 25 be fabricated from the following aluminum alloys: 2024, 7075, 7078 and 6061. The foregoing numerical designations refer, of course, to U.S. Alloy Compositions. It is particularly preferred that these alloys have a T-6 temper. Aluminum alloys having the foregoing compositions and temper are articles of trade and readily available and can be shaped into tubular articles by standard techniques, such as drawing or extruding heavy walled cylindrical billets to the required dimensions.

In fabricating the composite tubular element of the present invention, it is important that the metal core 25 be completely clean. To avoid any possible surface contaminants, the final cleaning of metal core 25 generally is made with a material such as alcohol or chlorofluorocarbons to remove traces of lubricants, grease, etc.

Metal core 25 of the present invention is encased in a sheath of resin-impregnated continuous unidirectional reinforcing fibers and glass fiber fabric which is bonded to core 25 so that it is substantially integral therewith. This sheet of resin impregnated fiber material is actually fabricated from various layers of materials; however, it is particularly preferred that the two layers of fiber-reinforced resin sheet material are ultimately bonded one to the other by curing of the resin contained therein.

In fabricating composite tubular elements, a laminate is first prepared by combining in proper sequence a number of individual laminae of substantially the same pattern. Thus, a lamina such as lamina 26 is cut from a sheet of unidirectional continuous fiber-reinforcing fibers impregnated with a plastic resin. Preferably the fibers in such fiber-reinforcing sheet material are carbon or graphite fibers and for convenience such fibers will be hereinafter referred to as graphite fibers. As is shown in the figures, this lamina 26 is cut to a predetermined pattern, the length of which preferably is slightly longer than the axial length of the fiber-reinforced layer in the final composite tubular element. The reason for this slight oversizing is for ease of manufacture which will become apparent upon a further reading of the detailed description. As can be seen from FIGS. 1 and 2, the preferred geometric pattern for the laminate (designated generally as 10) and hence each lamina is substantially triangular with end tabs 30 and 32 extending outwardly from the base of the triangle. The widths of the tabs 30 and 32 are equal to about twice the circumference of tubular core 25, thereby providing for substantially two full wraps of laminate material around core 25. The width of the fiber-impregnated sheet material as measured from the apex of the triangle to the base thereof will be sufficient that it can be divided for a plurality of wraps around the circumference of metal core 25. Preferably the width of the fiber-impregnated sheet material will be equal to about 6 times the circumference of the metal tube 25.

Figure 2:
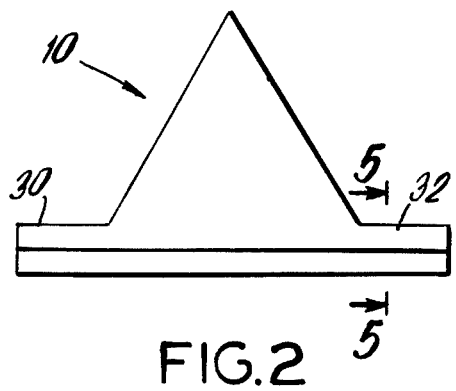
FIG. 2 is a top plan view of the preferred geometrical shape of the laminate employed in the practice of the present invention.
Figure 3:
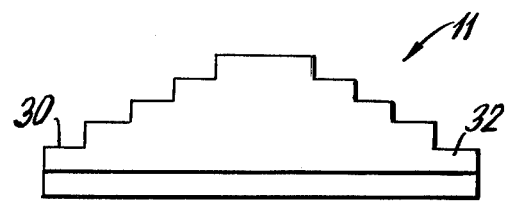
FIG. 3 is a top plan view of an alternate geometric shape of the laminate used in the practice of the present invention.
Figure 4:
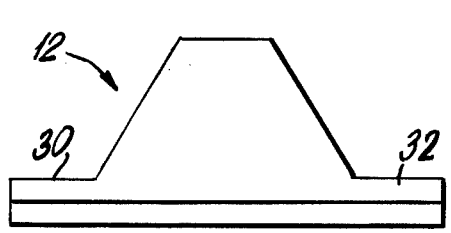
FIG. 4 is yet another top plan view of another alternate shape of laminate used in the practice of the present invention.

As is shown in FIGS. 3 and 4, alternate patterns can be employed in fabricating the laminate and ultimately the composite rotor. Indeed, each lamina can be cut into the desired pattern or the desired pattern can be achieved by combining different geometric shapes. Thus, the pattern 10 of FIG. 2 can be obtained by combining rectangular and triangular shapes, cut and arranged in alternating fashion. The pattern 11 of FIG. 3 can be obtained by using a multiple of rectangular shapes, each succeeding shape being slightly shorter than the preceding rectangle. FIG. 4 can be obtained by combining a trapezoid and a rectangle, and designated generally as 12, for example.

Referring again to lamina 26, the resin material impregnating the graphite fibers 22 of lamina 26 is a thermosetting resin. Indeed, the resin in all the resin-impregnated laminae is a thermosetting resin. Suitable thermosetting resins include epoxy and polyester resins.

The epoxy resins or polyepoxides, which are well known condensation products, are compounds containing oxirane rings with compounds containing hydroxyl groups or active hydrogen atoms such as amines and aldehydes. The most common epoxy resin compounds are those of epichlorohydrin and bis-phenol and its homologs.

The polyester resin is a condensation product of polybasic acids with polyhydric alcohols. Typical polyesters include polyterephthalates such as polyethylene terephthalate.

As is well known in the art, these thermosetting resins include modifying agents such as hardeners and the like. Forming such compounds is not a part of the present invention. Indeed, the preferred modified epoxy resin impregnated graphite fibers are commercially available materials. For example, modified epoxy pre-impregnated graphite fibers are sold under the trade name of Rigidite 5209 and Rigidite 5213 by the Narmco Division of Celanese Corporation, New York, N.Y. Other commercial sources of resin pre-impregnated graphite fibers are known in the industry.

In general, the resin-impregnated sheet material 26 will have a thickness of about 0.007 to 0.01 inches and contain from about 50 volume % to about 60 volume % of graphite fibers in the thermoset resin matrix. Preferably the sheet material 26 used in the present invention has 54 volume % to 58 volume % of continuous unidirectional graphite fibers in an epoxy resin matrix. Indeed, it is especially preferred that the graphite fibers have a Youngs modulus of elasticity in the range of 30 $\times 10^6$ to 50 $\times 10^6$ psi and a tensile strength in the range of about 200,000 to about 400,000 psi.

Turning again to the drawings, woven glass fabric layers or laminae designated generally as 24 and 27 are also provided. These laminae 24 and 27 of woven fiberglass have the same dimensions and geometric pattern as the resin-impregnated fiber-reinforcing lamina 26. The sheets of woven fiberglass 24 and 27 will have a thickness of about 0.001 to about 0.002 inches and will consist of woven glass fabric, preferably a fiberglass fabric known in the trade as fiberglass scrim. An especially useful fiberglass scrim is Style 107 sold by Burlington Glass Fabrics Company, New York, N.Y. As can be seen, the fibers 21 of the woven fiberglass fabric are at angles of 0° and 90° with respect to the major longitudinal axis of the sheet material 24 and 27.

As can be seen in the cutout of FIG. 1, the unidirectional graphite fibers 22 in lamina 26 are oriented at a specific predetermined angle $\theta_2$ with respect to the longitudinal axis of layer 26. In the next layer of resin-impregnated unidirectional continuous graphite fibers, i.e., layer 28, the unidirectional graphite fibers 20 are oriented at a negative predetermined specific angle $\theta_1$ with respect to the longitudinal axis of layer 28. Such angle is preferably the same dimension and of course opposite sign of the angle of orientation to the fibers in the first layer 26.

In fabricating the composite shaft, a multiplicity of layers of resin-impregnated continuous graphite fibers of woven fiberglass are cut from stock material to the desired flat pattern. Each layer is cut to the same size and shape. As is indicated above, the marginal edges of the ends of tabs 30 and 32 are sufficiently wide so as to accommodate at least two complete turns around the tubular metal core 25. Also, as indicated previously, the major axis generally will be determined by the desired length of the shaft, and preferably the major axis is slightly longer in length than the longitudinal length of the ultimate composite tubular element.

The various layers of sheet material are arranged in alternating sequence starting, for example, with a bottom layer of resin-impregnated graphite fibers followed by a layer of fiberglass, followed still by another layer of resin-impregnated graphite fibers, which in turn is followed by another layer of fiberglass. In FIG. 1, for example, there is provided a glass layer 24 and 27 and graphite fibers layers 26 and 28 in alternating sequence.

In each successive lamina of resin-impregnated unidirectional reinforcing fibers, however, it should be noted that the reinforcing fibers are oriented at a predetermined angle of orientation with respect to the major axis of that layer. Generally, this angle of orientation will range between about 5° to about 20° and preferably this angle of orientation will be about 10°. It is particularly preferred that the angle of orientation of the graphite fibers in each succeeding layer of resin-impregnated graphite sheet material be of the same magnitude but opposite orientation from the next preceding layer. Thus, with reference to FIG. 1, fibers 22 in sheet 26 are seen being oriented at angle $\theta_2$ and fibers 20 of sheet material 28 are oriented at an angle $\theta_1$ with respect to the length of the lamina. As indicated hereinabove, it is particularly preferred that the magnitude of $\theta_1$ and $\theta_2$ be the same and that $\theta_1$ and $\theta_2$ merely be opposite in sign, thereby, in effect, providing for a cross-ply of fibers.

In arranging the individual lamina in forming the laminate, it is particularly preferred to form a ply of sheet material consisting of a layer of resin-impregnated graphite fiber lamina having a woven fiberglass lamina on top of the graphite lamina. Then the plies are placed on top of the other.

Figure 5:
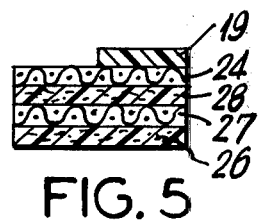
FIG. 5 is a vertical cross-section of the preferred laminate taken along lines 5—5 of FIG. 2.

As can be seen from FIGS. 1 and 5, the first ply comprises a layer of resin-impregnated graphite fiber sheet material 26 on which is superimposed a fiberglass layer 27. Next is provided a layer of resin-impregnated sheet material 28 on which is superimposed a fiberglass sheet material 24.

It should be noted that the embodiments shown in FIGS. 1, 2 and 5 include a rectangularly shaped layer 19. Layer 19 is a metal adhesive. The width of the rectangular layer 19 is sufficient to provide one full wrap around core 25. It is particularly important in the practice of the present invention that a metal adhesive layer be employed to bond the resin of the resin-impregnated sheet material to the tubular core 25. The metal adhesive material employed in the practice of the present invention is one typically employed for bonding plastics to metals such as elastomeric modified epoxy and elastomeric modified phenol-urea type resins. An example of one type of adhesive is a polysulfide elastomer modified epichlorohydrin-bis-phenol resin. Many structural adhesives are commercially available, one of which is known as Metlbond 1133 which is an elastomer modified epoxy material sold by the Narmco Division of Clelanese Corporation, New York, N.Y. Another is FM123-2 sold by American Cyanamid, Wayne, N.J. The structural metal adhesive can be applied to the top side of the fiberglass sheet material if the physical consistency of the adhesive permits. It can also be brushed or sprayed, for example, on the circumference of the metal core 25. In the practice of the present invention, it is particularly preferred to employ adhesive in the form of a thin film of sheet material such as sheet material 19 in FIGS. 1, 2 and 5.

Additionally, it has been found to be particularly advantageous to also apply, by brushing or spraying, a solution of the same adhesive used in layer 19 to the exterior of metal core 25 after the metal core has been adequately cleaned.

In general, the weight of structural metal layer employed in the practice of the present invention should be kept in the range of about 0.020 to about 0.040 lb/ft$^2$, and indeed it is particularly preferred that the weight of the adhesive layer 19 be kept to about 0.030 lb/ft$^2$. Apparently the amount of adhesive that is employed is important in assuring not only the proper bonding of the plastic resin to the metal core but also assuring the cooperation of the torsional rigidity of the metal tubing with the longitudinal stiffness of the graphite fiber reinforcement.

In any event, a polyagonal sheet of laminated material consisting of a structural adhesive layer 19, resin-impregnated graphite fibers and glass fabrics are wound around the circumference of metal core 25. It should be noted, of course, that the adhesive layer is placed in contact with the tubular metal core 25 and that the continuous unidirectional graphite fibers are arranged at angles between ±5° to ±20° (i.e. cross-plied) with respect to the longitudinal axis of the metal core, whereas the woven fiberglass layers are arranged at angles of between 0° and 90° with respect to the longitudinal axis of the metal core 25. After wrapping the metal core with the requisite layers of material, these materials can be held in place by means of cellophane tape, for example. Alternatively, the assembly of core and external resin-impregnated graphite fiber reinforcing material can be held in place by a wrapping of polypropylene heat shrinkable film (not shown) which serves in effect as a mold and which is subsequently removed as hereinafter described.

After wrapping the metal core with the requisite number of layers of material, the assembly is placed in an oven and heated to a temperature sufficient to cause a bonding of the separate layers and the various convolutions to each other. The temperature at which the assembly is heated depends upon a number of factors including the resin which is used to impregnate the graphite fibers. These temperatures are well known. Typically for a modified epoxy resin impregnated graphite fiber, the temperature will be in the range of about 100° C. to about 180° C. and preferably about 140° C.

If an external polypropylene wrapping film is used to hold the various layers around the core, this can be removed very simply by manually peeling it away from the surface of the shaft. Surface imperfections, if there are any on the shaft, can be removed by sanding or grinding or the like. If so desired, the shaft can be painted.

In view of the fact that it is not always possible to get a perfectly flat butt edge in the composite tubular material, as indicated before it is generally preferable to use a laminated sheet material which is slightly larger in length than the requisite length of the ultimate composite tubular element. In this way, any rounded shoulder such as shoulder 6 in FIG. 6 can be eliminated merely by making a radial cut through the tube behind the shoulder, thereby providing a perfectly straight butt edge if this is required for the composite tubular element.

The invention has been described with particular reference to composite shafts for transmitting substantial torsion and bending loads, irrespective of the applications of such shafts.

Figure 6:
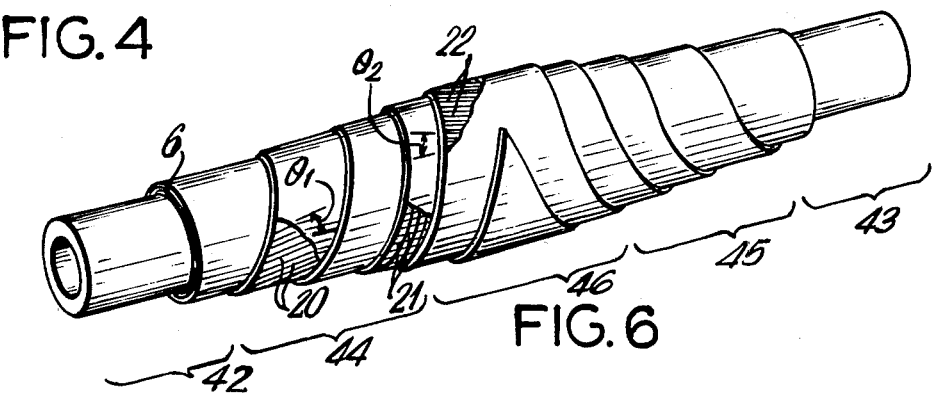
FIG. 6 is an exaggerated view, partially in perspective, of a tubular shaft of the present invention which also is partially cut away, exposing the fibers in the reinforcing layer.

To further illustrate the present invention, reference is now made herein to a typical composite shaft for a truck. In such an application, the metal core 25 typically will be in the range of 4 to 10 feet long and have an I.D. in the range of 2 inches to 4½ inches and an O.D. in the range of 3 inches to 5 inches. The shaft will have a layer of structural metal adhesive in the range from about 0.020 to 0.040 lb/ft$^2$. On top of the structural metal adhesive layer will be bonded thereto two plies of fiberglass scrim and the epoxy impregnated unidirectional continuous graphite fiber sheet material, each play consisting of a layer of scrim and a layer of fiberglass sheet material. The orientation of the woven glass fiber layers will be at 0° and 90° with respect to the longitudinal axis of the shaft. Each succeeding layer of graphite fiber will be about 10°, but in opposite direction to the next preceding layer. Thus, the graphite fiber is said to be oriented at ±10° with respect to the longitudinal axis. As can be seen in FIG. 6, such a drive shaft has a first end portion 42 and a second end portion 43 and two intermediate portions are also present, namely portions 44 and 45, respectively. Finally, there is a generally central portion 46. The fiber-reinforcing sheath in the area of the first end 42 and second end 43 provides for two full wraps around core 25. The number of wraps, however, that are disposed along the length of the tubular shaft varies in number such that the wall thickness along the length varies with the greatest thickness being disposed at substantially the mid-section of the shaft. In the truck shaft mentioned herein, the height of the substantially triangular portion of the pattern employed in preparing the laminated sheet material provides for substantially six or seven wraps around the central portion 46 of the tubular shaft and with decreasing wraps in the intermediate portions 44 and 45 along the length of the shaft.

In contrast thereto, a typical standard size automobile composite drive shaft of the present invention would have an aluminum core having a length between about 40 inches to 72 inches and an O.D. between 2½ inches to 3 inches and an I.D. between 2¼ inches to 2¾ inches. Such composite drive shaft would have generally about 2 plies of woven fiberglass and continuous graphite fibers impregnated with an epoxy resin, each ply consisting of a layer of fiberglass and a layer of resin-impregnated fibers. As with the drive shaft of the truck, the graphite fibers are oriented at '10° with respect to the longitudinal axis of the shaft and the glass fibers are oriented at 0° and 90° with respect to the longitudinal axis of the shaft. Additionally, the shaft will have interposed between the metal core and the reinforcing layer a layer of structural metal adhesive.

As indicated hereinabove, one of the difficulties associated with forming a composite tubular element for transmittal of axial and torque loads is that there is a vast difference in the physical properties of the metal core and the fiber-reinforced resin layer such that each resin layer tends to operate in opposition to the other. Various components of this composite structure are achieved via the proper orientation of the graphite fiberglass in the reinforcing material and in the layer of structural metal adhesive between the metal core and the continuous graphite fiber layer. Decrease in weight with no concomitant loss of strength is achieved by putting the maximum amount of fiber reinforcement at the point where the stresses are the greatest. Thus, the graduation of the fiber reinforcement from the first end toward the middle and increasing amounts and then decreasing downwardly to the second end of the tube is of great significance.

As should be appreciated, broad latitude and modification or substitution are intended in the foregoing disclosure. Accordingly, it is appropriate that the appended claims be construed broadly and in a manner consistent with the spirit and scope of the invention herein.

What is claimed is:

1. A tubular composite structure for transmitting substantial torsion and bending loads comprising:
    a tubular metal core;
    a layer of structural metal adhesive on the exterior surface of the metal core;
    a plurality of superimposed layers of resin-impregnated unidirectional continuous reinforcing fibers circumferentially wrapped around said tubular metal core, each layer of said resin impregnated fibers having the fibers oriented at an angle of between about 5° to 20° with respect to the longitudinal axis of the metal core and in opposite angular orientation with respect to the next preceding layer of said resin-impregnated fibers;
    a layer of woven fiberglass cloth interposed between each superimposed layer of said resin-impregnated reinforcing fibers; and
    a layer of woven fiberglass cloth interposed between said layer of structural metal adhesive and a said superimposed layer of said resin-impregnated reinforcing fibers;
    each of said plurality of superimposed layers of resin-impregnated unidirectional continuous reinforcing fibers and said layers of woven fiberglass cloth being shaped such that when circumferentially wrapped around the said tubular metal core the thickness of said layers wrapped around said core will vary along the length of the tubular structure with the maximum wall thickness being substantially at the mid-section of the tubular structure and the minimum thickness being at the first end and the second end of said tubular structure.

2. The structure of claim 1 wherein the resin is a thermoset resin.

3. The structure of claim 2 wherein the reinforcing fibers are selected from carbon and graphite and wherein said fibers are oriented with respect to the longitudinal axis of the tubular metal core at an angle of about 10°.

4. The structure of claim 3 wherein the woven fiberglass cloth is oriented so that the fibers therein are at 0° and 90° with respect to the longitudinal axis of the tubular metal core.

5. The structure of claim 4 wherein the metal core is selected from alloys of aluminum.

6. The structure of claim 5 wherein the structural metal adhesive is present in an amount ranging from about 0.020 to 0.040 lb/ft².

7. A composite shaft for transmitting forces comprising:
a tubular metal core having a layer of structural metal adhesive on the circumference of the tubular metal core in an amount ranging from about 0.020 to about 0.040 lb/ft², said tubular metal core having a first end and a second end and a mid-section;
a plurality of layers of laminated sheet material being circumferentially disposed around said metal core, said plurality of layers of laminated sheet material varying in number along the length of the tubular core so that the wall thickness along the length of the tubular core varies with the greatest thickness being disposed at substantially the mid-section of the shaft and decreasing in thickness outwardly to the first end and said second end of said shaft, said plurality of layers of said laminated sheet material consisting of alternating layers of woven fiberglass cloth and resin-impregnated unidirectional continuous reinforcing fibers, the fibers in said fiber-reinforcing sheet material being selected from carbon and graphite fibers, each layer of said resin-impregnated fibers being disposed at an angle of orientation between about 5° and 20° with respect to the longitudinal axis of the tubular metal core, but in opposite angular orientation with respect to the next preceding layer of said resin-impregnated fibers, said layers of woven fiberglass cloth being oriented at 0° and 90° with respect to the longitudinal axis of the tubular metal core.

8. In a composite rotating element for transmitting forces having a tubular metal core encased in a fiber-reinforced resin sheet wherein the fiber-reinforced resin sheet consists essentially of alternating layers of woven glass fabric and continuous unidirectional fibers selected from carbon and graphite, and wherein said woven glass fabric is oriented at 0° and 90° with respect to the longitudinal axis of the metal core and the continuous unidirectional reinforcing fibers are cross-plied at an angle of orientation between 5° and 20° with respect to the longitudinal axis of the tubular metal core, the improvement comprising varying the thickness of said fiber-reinforced resin sheet along the length of the tubular metal core, said thickness gradually increasing from the first end of said tubular metal core to the mid-section of said tubular metal core and then gradually decreasing from said mid-section of said metal core toward said second end of said tubular metal core.

* * * * *